US012701241B2

(12) United States Patent
Pihl et al.

(10) Patent No.: US 12,701,241 B2
(45) Date of Patent: Aug. 4, 2026

(54) CONTEXT-AWARE VIDEO CODEC BASED ON MACHINE LEARNING

(71) Applicant: Cisco Technology, Inc., San Jose, CA (US)

(72) Inventors: Jens Fredrik Pihl, Malmö (SE); William Edward Reed, Jacksonville, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 21 days.

(21) Appl. No.: 18/532,207

(22) Filed: Dec. 7, 2023

(65) Prior Publication Data

US 2025/0193415 A1 Jun. 12, 2025

(51) Int. Cl.
| | |
|---|---|
| *H04N 19/167* | (2014.01) |
| *G06V 10/77* | (2022.01) |
| *G06V 20/40* | (2022.01) |
| *G06V 20/62* | (2022.01) |
| *G06V 40/16* | (2022.01) |
| *H04N 19/136* | (2014.01) |
| *H04N 19/176* | (2014.01) |
| *H04N 19/42* | (2014.01) |

(52) U.S. Cl.
CPC ........... *H04N 19/167* (2014.11); *G06V 10/77* (2022.01); *G06V 20/41* (2022.01); *G06V 20/62* (2022.01); *G06V 40/171* (2022.01); *H04N 19/136* (2014.11); *H04N 19/176* (2014.11); *H04N 19/42* (2014.11)

(58) Field of Classification Search
None
See application file for complete search history.

(56) References Cited

U.S. PATENT DOCUMENTS

| | | | |
|---|---|---|---|
| 12,182,659 B1* | 12/2024 | Can ...................... | G06K 7/1443 |
| 2021/0168408 A1* | 6/2021 | Malakhov .............. | H04N 19/52 |
| 2022/0237799 A1* | 7/2022 | Price ........................ | G06T 7/174 |
| 2023/0319285 A1* | 10/2023 | Shanmugam ........ | H04N 19/136 |
| 2024/0303788 A1* | 9/2024 | Kanazawa .............. | G06T 7/194 |
| 2025/0005929 A1* | 1/2025 | Bonsor-Matthews ...................... G06V 10/25 |

OTHER PUBLICATIONS

Priestley J., "Is Apple Aiming to Use AI for Video Compression?", TVBEurope, Mar. 30, 2023, 1 page.
Wikipedia: "Rate-distortion Optimization", The Free Encyclopedia, last edited on Oct. 8, 2023, 2 pages.
Akyildiz, B., "Video Encoding through machine learning", Substack Inc., Apr. 17, 2021, 8 pages.

(Continued)

*Primary Examiner* — Christopher G Findley
(74) *Attorney, Agent, or Firm* — Edell, Shapiro & Finnan, LLC

(57) ABSTRACT

A method, computer system, and computer program product are provided for video encoding and decoding. A plurality of frames of video data are processed using a machine learning model to identify one or more regions of interest in the plurality of frames. The plurality of frames of video data are encoded by a video encoder such that one or more blocks of the plurality of frames of video data corresponding to the one or more regions of interest are prioritized over other blocks, to thereby produce encoded video data.

20 Claims, 12 Drawing Sheets

(56)  References Cited

OTHER PUBLICATIONS

Zvezdakov, S. et al., "Machine-Learning-Based Method for Content-Adaptive Video Encoding", Picture Coding Symposium (PCS), Bristol, United Kingdom, 2021, 5 pages.

Jones, T., "Introducing MediaKind's AI-based Compression Technology (ACT)", MediaKind, May 14, 2021, 7 pages.

Escribano, G. et al., "Video Encoding and Transcoding Using Machine Learning", MDM '08: Proceedings of the 9th International Workshop on Multimedia Data Mining: held in conjunction with the ACM SIGKDD 2008, Aug. 24, 2008, 11 pages.

Jones, T., "Improving Video Compression with AI", MediaKind, Aug. 10, 2021, 7 pages.

* cited by examiner

START

PROCESS VIDEO DATA USING MACHINE LEARNING MODEL TO IDENTIFY ONE OR MORE REGIONS OF INTEREST — 702

ENCODE THE PLURALITY OF FRAMES USING BLOCK-BASED ENCODING, WHEREIN BLOCKS CORRESPONDING TO REGIONS OF INTEREST ARE PRIORITIZED DURING ENCODING — 704

PROVIDE ENCODED VIDEO DATA TO RECIPIENT DEVICE — 706

END

900

START

PROVIDE TRAINING DATA TO MACHINE LEARNING MODEL — 902

TRAIN MACHINE LEARNING MODEL — 904

APPLY TRAINED MACHINE LEARNING MODEL AND UPDATE MACHINE LEARNING MODEL BASED ON COLLECTED FEEDBACK — 906

END

CONTEXT-AWARE VIDEO CODEC BASED ON MACHINE LEARNING

TECHNICAL FIELD

The present disclosure relates generally to video encoding and decoding.

BACKGROUND

A video codec refers to hardware and/or software for encoding and decoding video data. In the course of encoding video data, it is generally desirable that the encoded data is a compressed version of the unencoded video data, subject to certain quality constraints. Conventional video codec technologies employ an image pipeline that is handled as a black box, meaning that the video coder itself, with the aid of a rate controller, determines the quality of video according to a bitrate target. This can be a self-regulating process in which bits within frames are distributed according to the scene. Homogenous areas of frames may require fewer processing resources to encode and once encoded, require fewer bits compared to areas that are in motion or experiencing rapid changes (e.g., changes in contrast). However, rapidly-changing areas between frames can often correlate to important details in a video sample. Some areas, such as those depicting the sky or a tree moving in the breeze, can be notoriously difficult to encode since many coefficients are needed to faithfully represent the original video data.

In an attempt to reach a target bitrate, a rate controller may exceed the allocated amount of bits before being able to encode a complete frame. Conventional techniques address this problem by dividing a frame into bands and allocating each band its own target bitrate. This solution may be suitable for prerecorded content, but is not a solution useful for real-time content in which changes between frames cannot be known in advance.

BRIEF DESCRIPTION OF THE DRAWINGS

FIG. 6C is a diagram depicting a mask that is generated using the techniques presented herein, according to an example embodiment.

DETAILED DESCRIPTION

Overview

Figure 1:
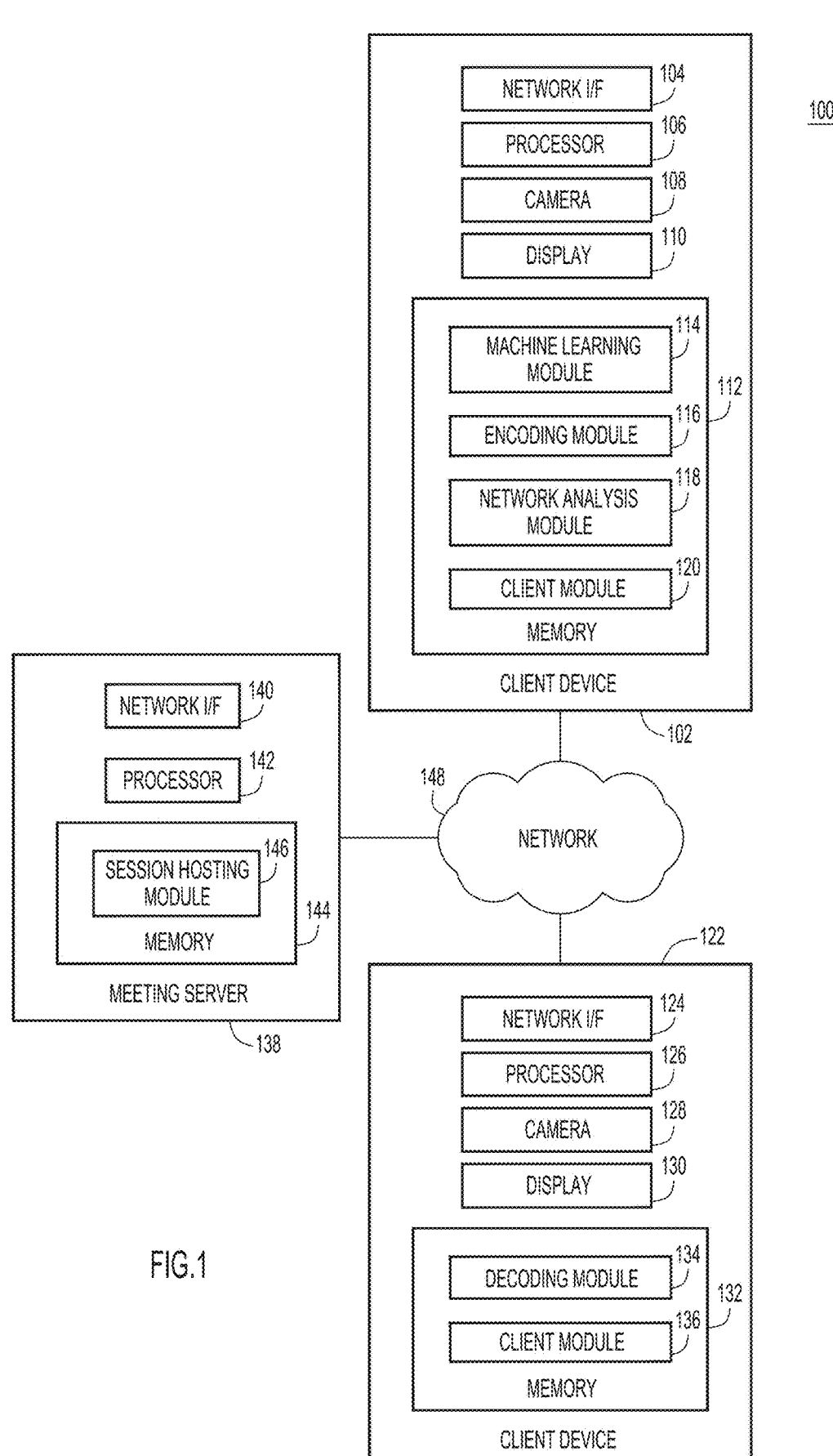
FIG. 1 is a block diagram of a communication environment that involves video encoding and decoding, according to an example embodiment.

According to one embodiment, techniques are provided for video encoding and decoding. A plurality of frames of video data are processed using a machine learning model to identify one or more regions of interest in the plurality of frames. The plurality of frames of video data are encoded by a video encoder such that one or more blocks of the plurality of frames of video data corresponding to the one or more regions of interest are prioritized over other blocks, to thereby produce encoded video data.

Example Embodiments

Present embodiments relate to video encoding and decoding, and more specifically, to a using machine learning techniques for pre-processing video data before being provided to a video encoder in order to simplify operations performed by the video encoder.

In order for a video encoder to control the bitrate and quality of encoded video, conventional techniques involve block-types or partition approaches, and quantization approaches, which are typically employed in combination. Block-type or partition techniques divide video frames into blocks and process the blocks separately, whereas quantization techniques reduce the amount of data in a lossy manner by reducing high precision values (e.g., 32-bit floating-point numbers) to lower precision values (e.g., 8-bit integers).

An approach that is used in many conventional codecs is called rate distortion optimization (RDO), which seeks an optimal trade-off between the bitrate (i.e., the compression rate) and the amount of distortion (i.e., the quality/fidelity of the reconstructed data). The goal of RDO is to determine the encoding parameters or compression settings that provide the highest quality for a given bitrate or, conversely, the lowest bit rate for a given level of quality. RDO techniques may select various permutations of block-types and other parameters until the amount of error in the resulting processed video (after compression and subsequent decompression), as compared to the original video, is below a certain threshold. For real-time video, conventional approaches configure these thresholds to be acceptable insofar as a particular encoder speed is reached so that the bitrate meets a target. However, conventional techniques can negatively impact the quality of video by inadvertently prioritizing unimportant contextual details over important details in the video.

To address this problem, the embodiments presented herein provide an improved approach to video codec technology in which machine learning techniques are employed to enable a video encoder to prioritize the important details in a given video stream. A machine learning model can feed a priori information into the encoder as metadata. This metadata gives the encoder indications of areas of importance for the end user. The areas of importance can be use-case dependent, and as such, different machine learning models may be trained and applied to detect particular aspects of a video that a video encoder should prioritize. For example, a face detection model may cause a video encoder to prioritize faces that appear in video over other content. As another example, a video conference may employ a machine learning model that detects and prioritizes text and/or other objects being presented.

Thus, present embodiments improve the technical field of video encoding/decoding and live video streaming technology by providing a context-aware video encoder that prioritizes desired content prior to encoding, thus enabling an encoder to focus available computing resources (e.g., processing resources, bandwidth resources, etc.) on content in video that is deemed important. Present embodiments therefore increase the efficiency of video encoder technologies by enabling meaningful information to be conveyed at a bitrate that would otherwise prevent the delivery of said meaningful information. Thus, present embodiments provide the practical application of improving video communication while also enhancing user experience.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description, and appended claims, or may be learned by the practice of embodiments as set forth hereinafter.

FIG. 1 is a block diagram in which a communication environment 100 for performing video encoding and decoding, according to an example embodiment. As depicted, communication environment 100 includes client devices 102 and 122, and a meeting server 138 that are in communication via a network 148. It is to be understood that the functional division among components has been chosen for purposes of explaining various embodiments and is not to be construed as a limiting example.

Client device 102 includes a network interface (I/F) 104, at least one processor (computer processor) 106, a camera 108, a display 110, and memory 112 (which stores instructions for a machine learning module 114, an encoding module 116, a network analysis module 118, and a client module 120). In various embodiments, client device 102 may include a rack-mounted server, laptop, desktop, smartphone, tablet, or any other programmable electronic device capable of executing computer readable program instructions. Network interface 104 may be a network interface card that enables components of client device 102 to send and receive data over a network, such as network 148. Client device 102 may enable a user to capture or generate video data, compress video data, store video data, share video data, and/or participate in a communication session involving the exchange of video data. Camera 108 may include a conventional or other image capture device for obtaining video data, such as video data of a user of client device 102 or other video data. Display 110 may include any electronic device capable of presenting information in a visual form. For example, display 110 may be a liquid crystal display (LCD), a cathode ray tube (CRT) display, a light-emitting diode (LED) display, an electronic ink display, and the like.

Machine learning module 114, encoding module 116, network analysis module 118, and client module 120 may include one or more modules or units to perform various functions of the embodiments described below. Machine learning module 114, encoding module 116, network analysis module 118, and client module 120 may be implemented by any combination of any quantity of software and/or hardware modules or units, and may reside within memory 112 of client device 102 for execution by a processor, such as processor 106.

Machine learning module 114 may include one or more machine learning models that are trained to identify regions of interest in video data. The regions of interest can be use-case dependent, and as such, the training data can include samples of video data (e.g., images and/or time-series frames) that are labeled with respect to a desired region of interest. The training data can be labeled by indicating a group of pixels that correspond to a region of interest; a region of interest may include non-adjacent pixels, a closed two-dimensional area (which can be defined by an n-sided polygon, etc.), or by any other approach for defining a group of pixels in image data. Thus, machine learning models can be trained based on the particular examples included in the training data to identify regions of interest for a variety of applications in order to identify particular features in video data. In some embodiments, different machine learning models are trained to specialize in the recognition of certain features.

The machine learning model(s) of machine learning module 114 can be trained to recognize regions of interest in video data that can include any selected feature or group of features in video. By way of example, the regions of interest can include, but are not limited to, a person or any portion thereof (e.g., a head of a person, a face of a person, eyes of a person, mouth of a person, nose of a person, ears of a person, arms of a person, legs of a person, an upper portion of a person including an upper torso and head, hair, etc.), an object or any portion of an object (e.g., a ball or other apparatus used in a sporting or gaming event, a clipboard, a sign, a vehicle, a food or drink, a tool, a computing device, a logo, etc.), text (e.g., text on an object, text in a slide of a presentation, etc.), an action (e.g., an object being moved by a person, an object in motion, a gesture, etc.), or any other object, symbol, organism, or occurrence depicted in video data. In some embodiments, the regions of interest may include any portions of frames that have a lower brightness compared to other portions of frames. If a portion of a frame has a brightness level that is below a threshold amount of brightness as compared to other areas in the frame, the darker portion can be labeled as a region of interest so that the encoder can focus on this region in order to perform operations that improve the fidelity, such as adjusting the brightness (or contrast, etc.) of these portions and/or adjusting the brightness of other portions. A machine learning model can be trained using a set of training data that includes examples of data that contain the features that the model is being trained to detect, and a machine learning model can be tested using another set of examples of data that includes the same features (which can be reserved from the same data source as the training data). Thus, a machine learning model can be trained to identify regions of interest until a threshold level of accuracy is attained.

The machine learning model may be trained to identify whether video data is natural video, video of a screen (e.g., a shared presentation), or a mix of the two in order to remove cycles from the encoding process. This information can also be transmitted per block. Using the machine learning model, a mask can be generated, e.g., on an 8×8 resolution with respect to the raw video data, indicating whether or not a block contains text. If a block does not contain text, the encoder can encode the block with parameters that reduce the fidelity of that block. However, if a block contains text, the block can be encoded with higher fidelity parameters in order to increase the legibility of the text in decoded video.

The type(s) of machine learning model(s) employed by machine learning module 114 may include any machine learning model suitable for identifying objects or occurrences in video data. In various embodiments, the machine learning model(s) can include a deep learning neural network (e.g., convolutional neural network, recurrent neural network, transformer neural network, etc.), and the like. The input of a machine learning model may include video data, and the output may include an indication of portions of the video data in which regions of interest are identified. As an example, each pixel can be labeled as either belonging to a region of interest or not belonging to a region of interest. In other embodiments, a mask may be output that corresponds to the input data but at a lower resolution, and each pixel or group of pixels in the mask can be labeled with respect to the presence or absence of a region of interest. For example, each pixel in a mask may correspond to an n-by-n pixel block (e.g., 64×64 pixel block, etc.) of the input video data.

Encoding module 116 may include logic for encoding input video data for storage and/or transmission and subsequent decoding by a same or other computing device (e.g., client device 102 and/or client device 122). Encoding module 116 may encode raw video data (e.g., video data obtained by camera 108 or from another source) into a representation that occupies a smaller data volume, reducing the amount of data needed for storage or transmission while maintaining an acceptable level of visual quality. The encoding process can involve various steps, such as frame division, spatial compression, transform coding, quantization, entropy encoding, motion estimation, rate-distortion optimization (RDO), bitstream generation, and the like. Initially, raw video input can be divided into frames, each comprising an image that the encoder can process independently or with reference to other frames. Within each frame, spatial compression techniques can be applied. The spatial compression techniques can reduce redundancy by predicting the content of a block based on neighboring blocks. The difference (also known as residual) between the prediction and the actual pixel values is then stored. For transform coding, the spatially compressed data is transformed into a frequency domain using techniques such as Discrete Cosine Transform (DCT) or wavelet transforms. Transform coding may decorrelate pixel values, making them more computationally efficient to compress. After a transform, the transformed coefficients can be quantized, which is a process that reduces the precision of the coefficients. Thus, quantization involves a degree of loss of information, and the quantization parameters determine the trade-off between compression efficiency and visual quality.

The quantized data may further be compressed using entropy coding techniques (e.g., Huffman coding, arithmetic coding, etc.). These techniques can assign shorter codes to more frequently occurring values in the data, thereby reducing the overall bit rate. For motion estimation and inter-frame compression, encoding module 116 may identify temporal redundancies between frames. Instead of (or in addition to) encoding each frame independently, the encoding module 116 can estimate motion between frames to identify how objects move from one frame to the next, and encode the motion vectors. Encoding module 116 may thus generate a bitstream that includes the encoded video data, motion vectors, and any other desired information. The output bitstream may include all the encoded data in a format suitable for transmission and/or storage. In some embodiments, encoding module 116 employs RDO techniques to adjust encoding parameters dynamically, determining an optimal trade-off between bit rate and visual quality for each frame or block. In some embodiments, encoding module 116 may employ adaptive techniques that adjust the encoding strategy based on the characteristics of the video content. This may involve dynamically changing quantization parameters, block sizes, or other encoding settings. Additionally or alternatively, encoding module 116 may include header information in the bitstream, providing data about the video format, resolution, super resolution, frame rate, and/or other parameters. This header information can be utilized by a decoder to interpret and decode received compressed video.

Encoding module 116 may use the regions of interest that are identified in video data to assign different priorities to blocks that correspond to the regions of interest during encoding. For example, encoding module 116 can be configured to encode a given block as an i-block, a p-block, a b-block, or a skip-block based on the determined level of priority. Thus, blocks that correspond to the most important regions of interest can be encoded in a manner that requires a greater number of bits as compared to blocks that correspond to lesser-important regions of interest. The level of importance can be tiered so that a given frame can have blocks with four or more levels of priority. For example, a region of interest corresponding to a person's mouth may be encoded using i-block encoding, the rest of the person's face may be encoded with p-block encoding, the rest of the person's body may be encoded with b-block encoding, and the background may be encoded with skip-block encoding.

Network analysis module 118 may include logic for obtaining data describing network functionality, including bandwidth, throughput, latency, and the like. Network analysis module 118 may perform various operations to evaluate network performance, such as ping tests, throughput tests, and the like, in order to obtain data describing network functionality. In particular, network analysis module 118 may obtain data that describes network conditions with respect to streaming video data to other devices, such as client device 122. Thus, network analysis module 118 can establish the amount of data that a network connection can support in order to stream a bitstream to other devices, which can be streamed directly or via one or more servers (e.g., meeting server 138). The data describing network functionality can be provided to encoding module 116 to establish a target bitrate for encoding a bitstream.

Client module 120 may perform various operations to enable a user of each client device (e.g., client devices 102 and 122) to participate in a video communication session. Client module 120 may obtain as input video data, audio data, and/or text data from each client device (e.g., client devices 102 and 122) and share the data (e.g., compressed video data) to other client devices. The exchange of data between users can be performed in real-time or near-realtime in order to enable collaboration between users, and the exchange of data may be facilitated by a server (e.g., session hosting module 146 of meeting server 138). Client module 120 may share to a recipient device (e.g., client device 122), data including an encoded bitstream of video data that is generated in accordance with the techniques presented herein.

Client device 122 includes a network interface (I/F) 124, at least one processor (computer processor) 126, a camera 128, a display 130, and memory 132 (which stores instructions for a decoding module 134 and a client module 136). In various embodiments, client device 122 may include a rack-mounted server, laptop, desktop, smartphone, tablet, or any other programmable electronic device capable of executing computer readable program instructions. Network interface 124 enables components of client device 122 to send and receive data over a network, such as network 148. Client device 122 may enable a user to receive video data, decompress video data, and/or participate in a communication session involving the exchange of video data. Camera 128 may include a conventional or other image capture device for obtaining video data, such as video data of a user of client device 122 or other video data. Display 130 may include any electronic device capable of presenting information in a visual form. For example, display 130 may be a liquid crystal display (LCD), a cathode ray tube (CRT) display, a light-emitting diode (LED) display, an electronic ink display, and the like.

Decoding module 134 and client module 136 may include one or more modules or units to perform various functions of the embodiments described below. Decoding module 134 and client module 136 may be implemented by any combination of any quantity of software and/or hardware modules or units, and may reside within memory 132 of client device 122 for execution by a processor, such as processor 126.

Decoding module 134 may include one or more video decoders that are configured to decode received encoded video data. Decoding module 134 may reconstruct encoded video data into a format that can be displayed or further processed by performing operations such as reversing the processes applied by the encoder. Thus, for example, decoding module 134 may perform operations including entropy decoding, inverse quantization, inverse transforms, motion compensation, inter-frame reconstruction, and the like. In some embodiments, decoding module 134 performs super resolution operations that enhance the resolution of the resulting decoded video, which may involve one or more trained machine learning models. Video decoding is described in further detail below with reference to FIG. 5.

Client module 136 may perform various operations to enable a user of each client device (e.g., client devices 102 and 122) to participate in a video conferencing session. Client module 136 may obtain as input video data, audio data, and/or text data from each client device (e.g., client devices 102 and 122) and share the data to other client devices. The exchange of data between users can be performed in real-time or near-real-time in order to enable collaboration between users, and the exchange of data may be facilitated by a server (e.g., session hosting module 146 of meeting server 138). Client module 136 may share to a recipient device (e.g., client device 102), data including a encoded bitstream of video data that is generated in accordance with the techniques presented herein, and/or client module 136 may receive a encoded bitstream from another device (e.g., client device 102) and decode the encoded video data and present the recovered video data in accordance with the embodiments presented herein.

Meeting server 138 includes a network interface (I/F) 140, at least one processor (computer processor) 142, and memory 144 (which stores instructions for a session hosting module 146). In various embodiments, meeting server 138 may include a rack-mounted server, laptop, desktop, smartphone, tablet, or any other programmable electronic device capable of executing computer readable program instructions. Network interface 140 enables components of meeting server 138 to send and receive data over a network, such as network 148. Meeting server 138 may include one or more modules or units to perform various functions of the embodiments described below. Meeting server 138 may be implemented by any combination of any quantity of software and/or hardware modules or units, and may reside within memory 144 of meeting server 138 for execution by a processor, such as processor 142.

Session hosting module 146 may perform operations relating to initiating and hosting conferencing sessions between participants, including facilitating the exchange of data between endpoint devices of participants. Session hosting module 146 may facilitate the exchange of video data, audio data, and/or text data during a conferencing session so that users can communicate with each other during the session. The data that is exchanged may be received from video cameras, microphones, and/or other input devices, and can be obtained from, and/or provided to, any devices participating in a conferencing session. The data that is exchanged may include video data that has been encoded in accordance with the embodiments presented herein, which may additionally include metadata as also described herein.

Network 148 may include a local area network (LAN), a wide area network (WAN) such as the Internet, or a combination of the two, and includes wired, wireless, or fiber optic connections. In general, network 148 can be any combination of connections and protocols known in the art that will support communications between client device 102, client device 122, and/or meeting server 138 via their respective network interfaces in accordance with the described embodiments.

Figure 2:
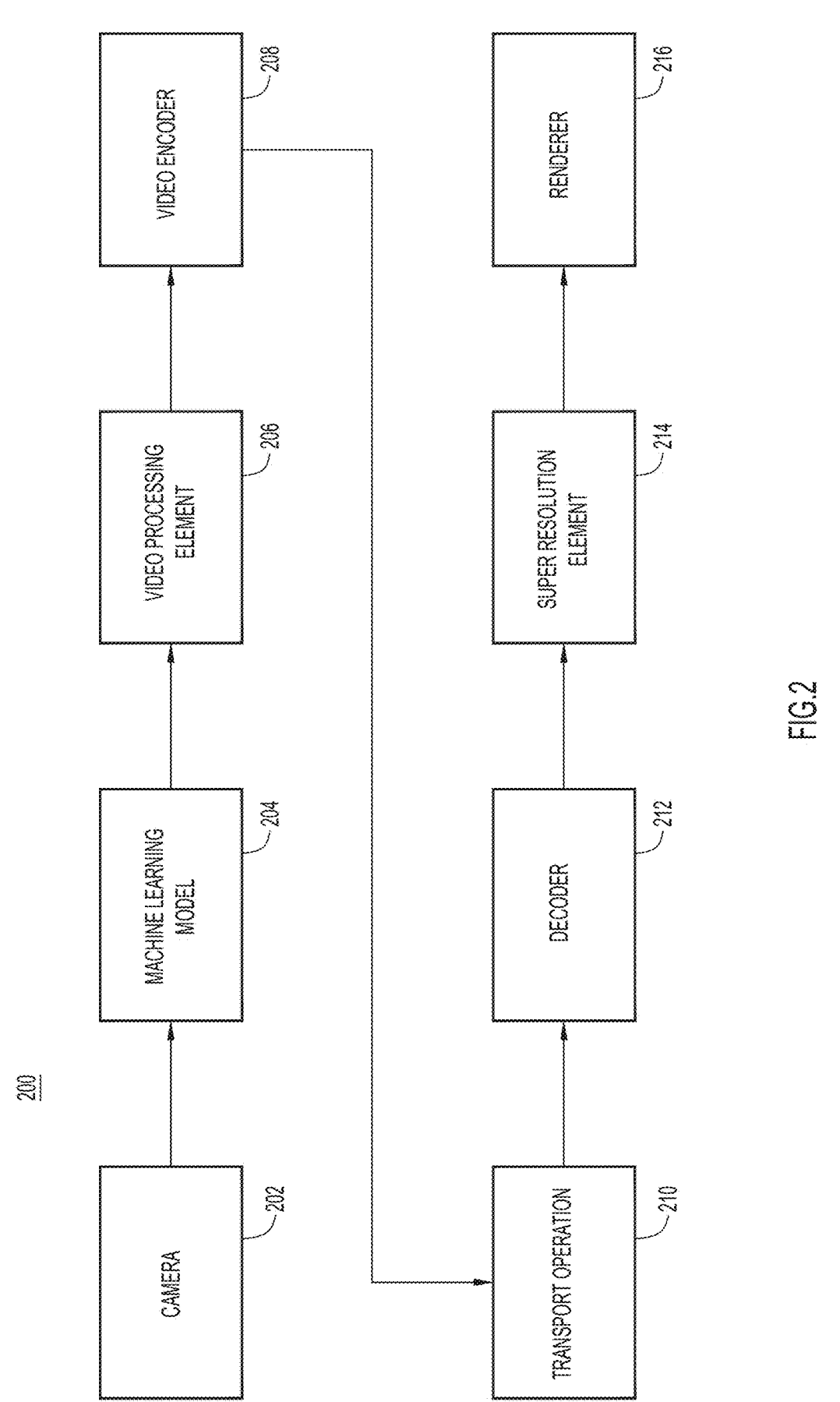
FIG. 2 is a diagram depicting a video codec operational flow, according to an example embodiment.

FIG. 2 is a diagram depicting a video codec operational flow 200, according to an example embodiment. As depicted, video codec operational flow 200 involves a camera 202, a machine learning model 204, a video processing element 206, a video encoder 208, a transport operation 210, a decoder 212, a super resolution element 214, and a renderer 216. Each of these elements may correspond to one or more elements that are depicted and described with reference to FIG. 1. For example, camera 202 may correspond to camera 108 and/or camera 128, machine learning model 204 may correspond to machine learning module 114, video processing element 206 and/or video encoder 208 may correspond to encoding module 116, decoder 212 may correspond to decoding module 134, and the like.

Camera 202 may include a video capture device that can convert photons into pixel data. Camera 202 may utilize the photoelectric effect with the aid of quantum wells, microlenses and/or transistors to deliver a stream of bytes in a particular color model, such as a red-green-blue (RGB) model, or a luma, blue-difference chroma, and red-difference chroma (YCbCr) color space.

Machine learning model 204 may be trained on a training corpus of content corresponding to video data, including video conferencing data that was captured in real-time, in order to analyze the data and extract meta-information about the content within frames. Machine learning model 204 may generate a map that contains information about the location of regions of interest for a selected frame. For example, the map may indicate coordinates in a frame that correspond to a person's face, or a mesh can be generated describing the location of feature points such as face, mouth, eyes, hands, objects, etc.

The source pixels (e.g., from camera 202) can be provided for further processing together with the corresponding metadata from machine learning model 204 to be processed by video processing element 206. Video processing element 206 may perform operations such as scaling, rotating, enhancing, color-correcting, and the like. Any component in the processing chain of video processing element 206 can inspect the metadata in order to spatially consider regions of interest during processing.

The processed pixels are received by video encoder 208, which reads each frame to be encoded together in combination with the associated metadata output by machine learning model 204. The video encoder 208 uses the metadata to make decisions, such as more quickly encoding a block (at the expense of quality) and thus increasing the throughput of the encoder, or controlling the spatial quality within a frame so that regions of interest within a frame are encoded with higher or maximum fidelity (at the expense of non-important areas). Thus, given a budget for a bitstream that is measured in a number of bits, more bits are intelligently allocated to regions of interest. The metadata is also added to the bitstream for optional use by a decoder. Furthermore, the regions of interest can be target-bitrate adoptable, meaning that the areas that are deemed important can depend on the available bandwidth. For example, given a high bandwidth, a large region of interest such as an entire person or an entire head of a person may be provided with maximum fidelity by the encoder, whereas for a lower bandwidth, only a smaller region of interest corresponding to a person's face or eyes and/or mouth may receive the highest available fidelity.

The encoded (and thus compressed) video data is sent over a channel at transport operation 210 and is received by another computing entity that includes decoder 212. Since the metadata can be encoded in the bitstream, decoder 212 can extract the metadata along with each frame to be rendered.

A super resolution element 214 can receive the metadata together with the raw pixels (i.e., decoded video data that is output by decoder 212) in order to spatially select which areas should be allocated greater processing resources. Thus, super resolution operations can perform operations that enhance the regions of interest on the decoder side of video codec operational flow 200. Renderer 216 may perform rendering operations in order to present spatially-optimized frames to an output device (e.g., a display).

Figure 3:
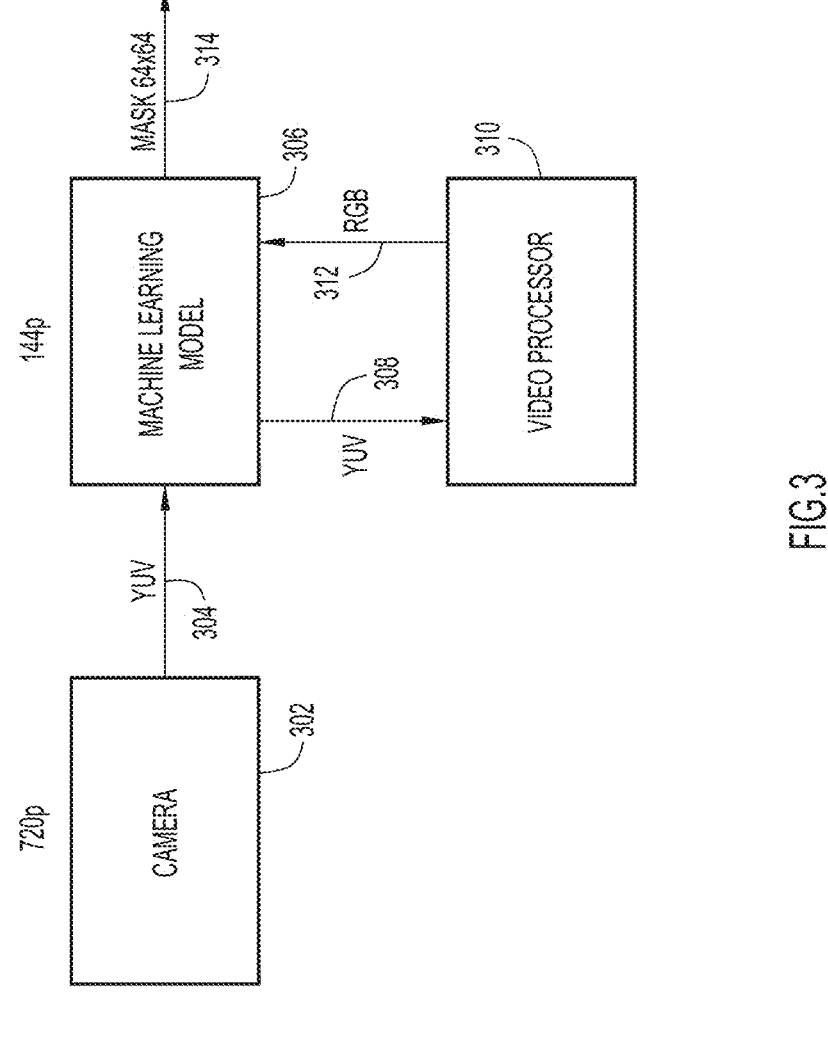
FIG. 3 is a block diagram depicting a video encoder system, according to an example embodiment.

FIG. 3 is a block diagram depicting a video encoder system 300, according to an example embodiment. As depicted, video encoder system 300 includes a camera 302, a machine learning model 306, and a video processor 310. Initially, camera 302 may capture raw video data in a particular resolution (e.g., 720p) and provide the video data in a luma (Y) blue projection (U) and red projection (V) color space (i.e., a YUV color space) to machine learning model 306 at operation 304. Machine learning model 306 may generate a mask that indicates regions of interest in the video data, and passes the video data (as YUV data) and mask metadata to video processor 310 at operation 308. Video processor 310 may perform various operations such as scaling, rotating, enhancing, color-correcting, and the like, and may convert the video data to a RGB color space, sending the data back to machine learning model 306 at operation 312.

The central processing unit (CPU) utilization of video encoder system 300 can be reduced by operating only on the YUV data and at resolutions at or below 144p (which may be generated by downscaling the 720p source data from camera 302). Machine learning model 306 may execute on either a CPU or a graphical processing unit (GPU); by offloading some of the computation to a GPU using machine learning model 306 running on 144p RGB data and delivering a mask (e.g., 64×64 mask that is output at operation 314) with a priori information to an encoder (not shown) that correlates the source pixels to the 64×64 mask, a small increase in a GPU's processing load for the mask generation will result in a substantial drop in CPU usage for the encoder since RDO operations can be performed as early as possible. Thus, present embodiments may improve the functionality of a computing device by reducing CPU utilization, mitigating or avoiding CPU bottlenecks, and improving the quality of processed video.

The 64×64 mask may include pixels that correspond to the original data captured by camera 302: specifically, each pixel in the mask may correspond to a 64 by 64 pixel block in the raw video data. While the mask shown in video encoder system 300 is a 64×64 mask, it should be appreciated that any size mask may be employed.

In some embodiments, a mask is generated for each frame. In other embodiments, a mask may be generated for every nth frame. In yet other embodiments, a mask may be generated when certain criteria are met, such as when there is a threshold amount of change between frames in the video data. Thus, a same mask may be applied to a set of frames until there is a threshold amount of change in a next one or more frames, in which case, a new mask may be generated and applied.

By using a mask to reduce the processing requirements of the various elements of a video encoder, various benefits can be realized. For example, an optical flow analysis can be performed between adjacent frames in order to pass a mask of hypothetical motion vectors for each block. These vectors enable an encoder to perform a fine-grained diamond-search around the received motion vector. An encoder can operate on a complex Group-of-Pictures (GOP) structure with up to eight frames or more in memory. Prediction is performed with respect to these frames in memory in order to find parameters that minimize the residual. As part of the metadata received, a flag indicating which frame in a window of frames is the most similar to the current frame. Then the encoder can use this information to target the search towards this frame, again reducing the amount of processing resources required by the encoder. Using a map of the predominant angle per block, an encoder can encode intra-blocks and intra/key-frame more optimally and thus reduce the size of those blocks and frames.

Figure 4:
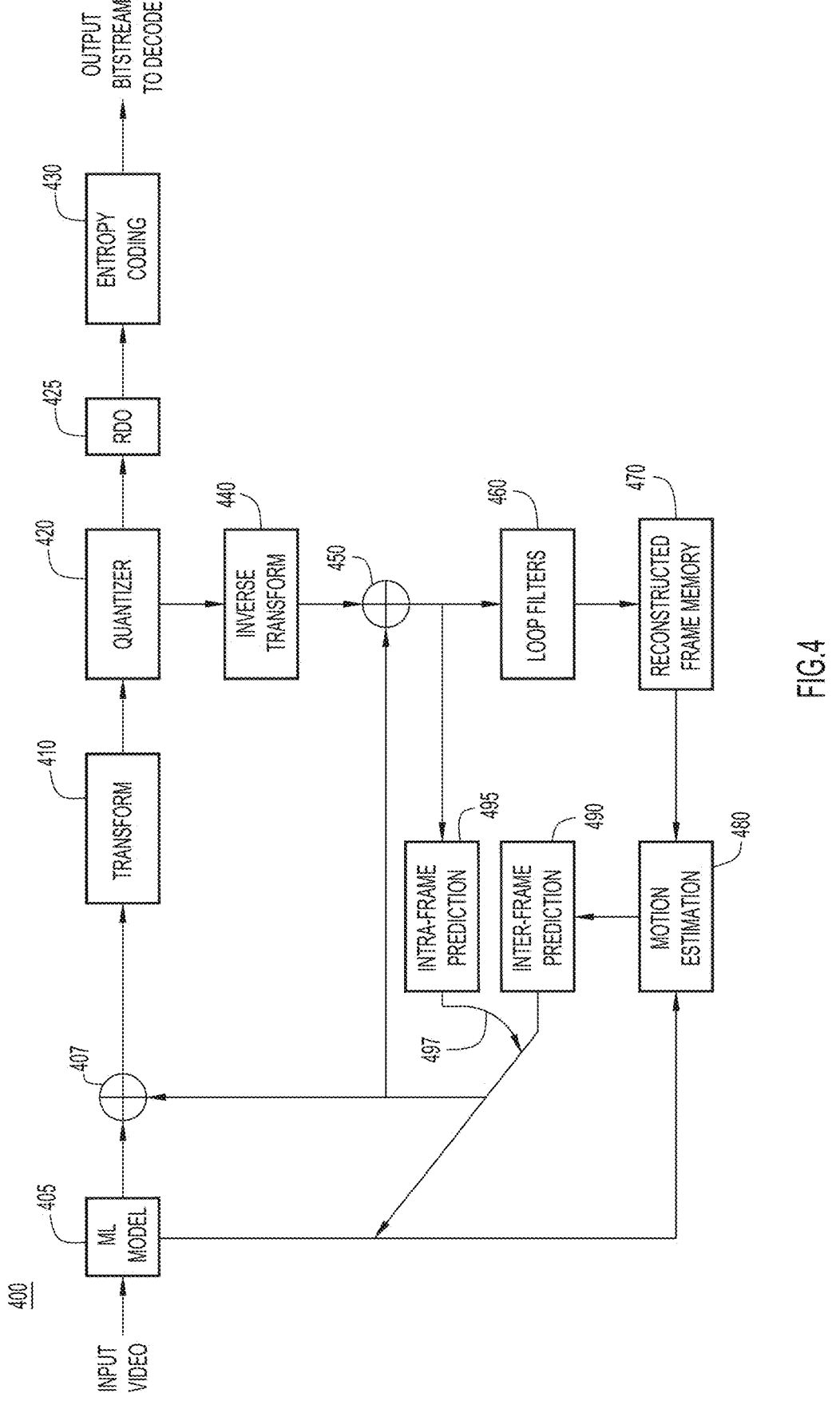
FIG. 4 is a block diagram depicting a video encoder, according to an example embodiment.

FIG. 4 is a block diagram depicting a video encoder 400, according to an example embodiment. Video encoder 400 includes a machine learning (ML) model 405, a subtractor 407, a transform element 410, a quantizer element 420, an entropy coding element 430, an inverse transform element 440, an adder 450, one or more loop filters 460, a reconstructed frame memory 470, a motion estimation unit 480, an inter-frame prediction unit 490, an intra-frame prediction unit 495 and a switch 497.

Initially, raw video data is processed with ML model 405 in order to identify regions of interest in the frames of the video data, which can be indicated via metadata that is associated with the frames of the video data. These regions of interest may be utilized by the various components of video encoder 400 in order to prioritize the fidelity of any blocks of video data that correspond to the regions of interest over other blocks of video data. A current frame (input video) as well as a prediction frame are input to a subtractor 407. The subtractor 407 is provided with input from either the inter-frame prediction unit 490 or intra-frame prediction unit 495, the selection of which is controlled by switch 497. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 480 supplies a motion estimation output as input to the inter-frame prediction unit 490. The motion estimation unit 480 receives as input the input video and an output of the reconstructed frame memory 470.

The subtractor 407 subtracts the output of the switch 497 from the pixels of the current frame, prior to being subjected to a two dimensional transform process by the transform element 410 to produce transform coefficients. The transform coefficients are then subjected to quantization by quantizer element 420 and then supplied to rate distortion optimization (RDO) unit 425, followed by entropy coding element 430. RDO unit 425 may vary encoding parameters, such as quantization parameters, to create a set of options for encoding particular blocks in frames. RDO unit 425 may receive metadata from ML model 405 in order to identify blocks that should be prioritized over other blocks in frames; the prioritized blocks may correspond to regions of interest identified in the video data. Thus, in order to meet a target bitrate, RDO unit 425 can identify a priority for each block in a frame and ensure that blocks are encoded in a manner that results in higher-priority blocks having a higher fidelity over lower-priority blocks.

Entropy coding element 430 applies entropy encoding in order to remove redundancies without losing information, and is referred to as a lossless encoding process. Subsequently, the encoded data is arranged in network packets via a packetizer (not shown), prior to being transmitted in an output bit stream.

The output of the quantizer element 420 is also applied to the inverse transform element 440 and used for assisting in prediction processing. The adder 450 adds the output of the inverse transform element 440 and an output of the switch 497 (either the output of the inter-frame prediction unit 490 or the intra-frame prediction unit 495). The output of the adder 450 is supplied to the input of the intra-frame prediction unit 495 and to one or more loop filters 460 which suppress some of the sharpness in the edges to improve clarity and better support prediction processing. The output of the loop filters 460 is applied to a reconstructed frame memory 470 that holds the processed image pixel data in memory for use in subsequent motion processing by motion estimation unit 480.

The various modules or functions of video encoder 400 may divide each frame into blocks in order to process as many of the blocks with the highest fidelity target parameters permitted by the available bandwidth for the resulting bitstream. Using the mask data generated by the ML model 405, the blocks that correspond to regions of interest can be identified and prioritized over other blocks, so that if any blocks are processed with parameters that result in a lower fidelity, those blocks can be selected as blocks that do not correspond to regions of interest. Thus, blocks associated with regions of interest can be prioritized over other blocks during the encoding process to ensure that regions of interest are encoded with parameters associated with the highest possible fidelity.

Figure 5:
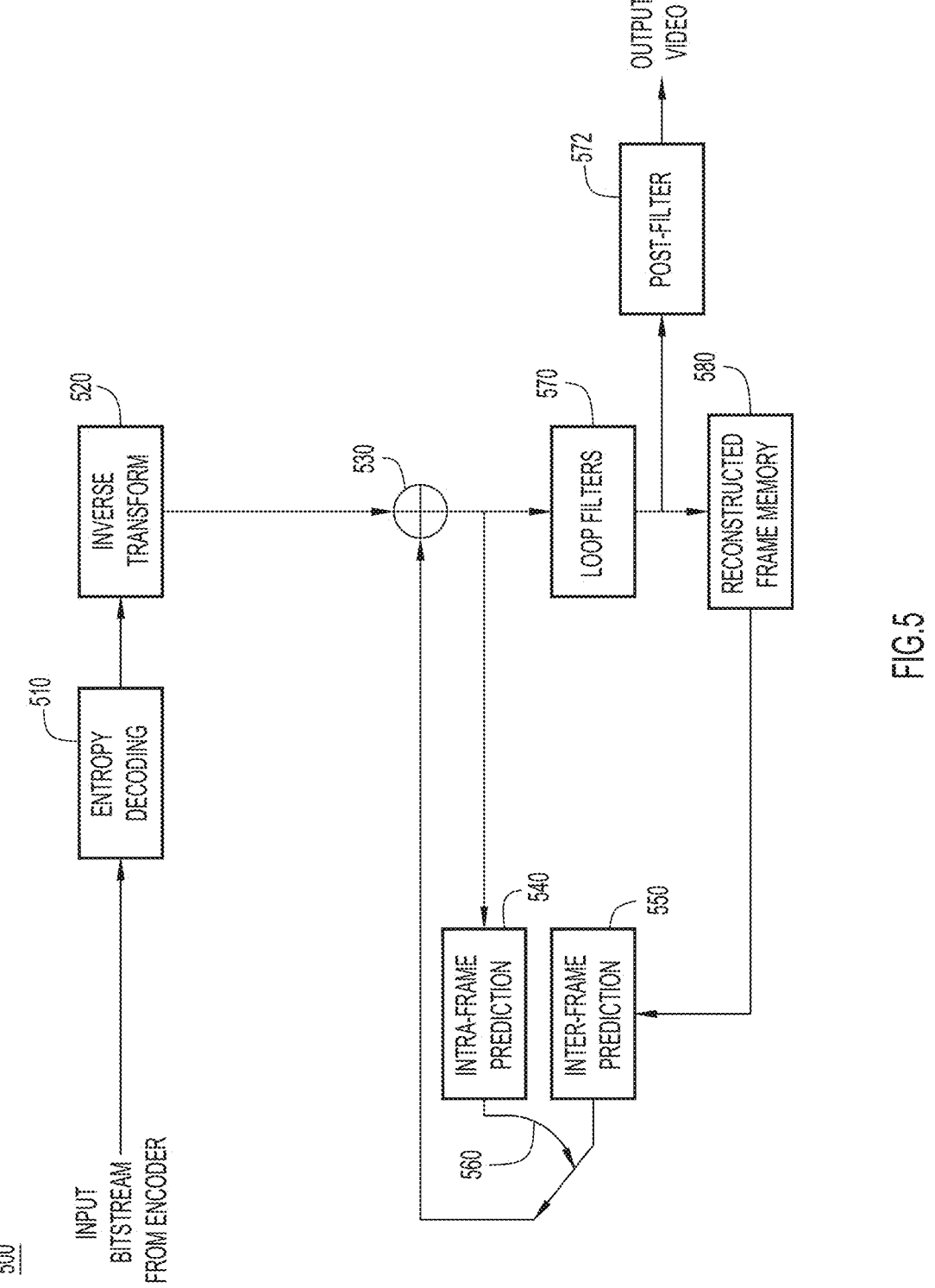
FIG. 5 is a block diagram depicting a video decoder, according to an example embodiment.

FIG. 5 is a block diagram depicting a video decoder 500, according to an example embodiment. The video decoder 500 includes an entropy decoding unit 510, an inverse transform element 520, an adder 530, an intra-frame prediction unit 540, an inter-frame prediction unit 550, a switch 560, one or more loop filters 570 and a reconstructed frame memory 580. In addition, a post-filter unit 572 is shown in FIG. 5. The received input bitstream may be encoded according to the embodiments presented herein, and may include metadata, such as a mask indicating the regions of interest for frames of the video data. The entropy decoding unit 510 performs entropy decoding on the received input bitstream to produce quantized transform coefficients which are applied to the inverse transform element 520. The inverse transform element 520 applies two-dimensional inverse transformation on the quantized transform coefficients to output a quantized version of the difference samples. The output of the inverse transform element 520 is applied to the adder 530. The adder 530 adds to the output of the inverse transform element 520 an output of either the intra-frame prediction unit 540 or inter-frame prediction unit 550. The loop filters 570 reduce artifacts introduced during the compression process by addressing blockiness and other distortions that can occur at block boundaries due to quantization and other compression-related factors. The loop filters are thus applied toward the end of the decoding process to remove these artifacts and enhance the overall visual appearance of the reconstructed video. An output video stream is provided by the post-filter unit 572, which can apply additional processing techniques, such as super resolution. Super resolution techniques may involve the use of trained machine learning models to apply upscaling effects that generate predicted higher-resolution frames or portions thereof by analyzing lower-resolution data. In some cases, the super resolution techniques are applied to all blocks in a frame. In other cases, if there are not adequate processing resources to process entire frames using super resolution techniques, processing may focus on any blocks that correspond to regions of interest. Thus, the regions of interest will receive prioritized treatment by video decoder 500, ensuring that desired content can have the best available fidelity.

Figure 6A:
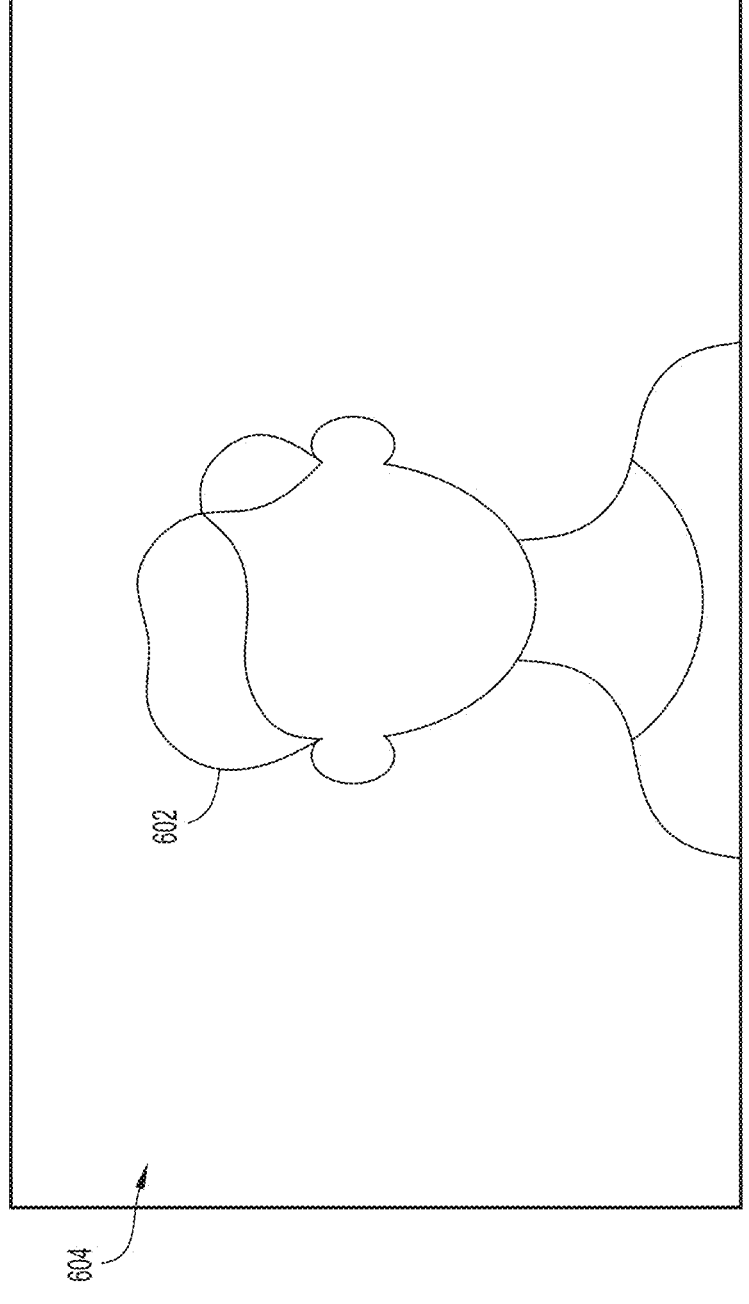
FIG. 6A illustrates a video frame that is used for an example of describing the techniques presented herein, according to an example embodiment.
Figure 6B:
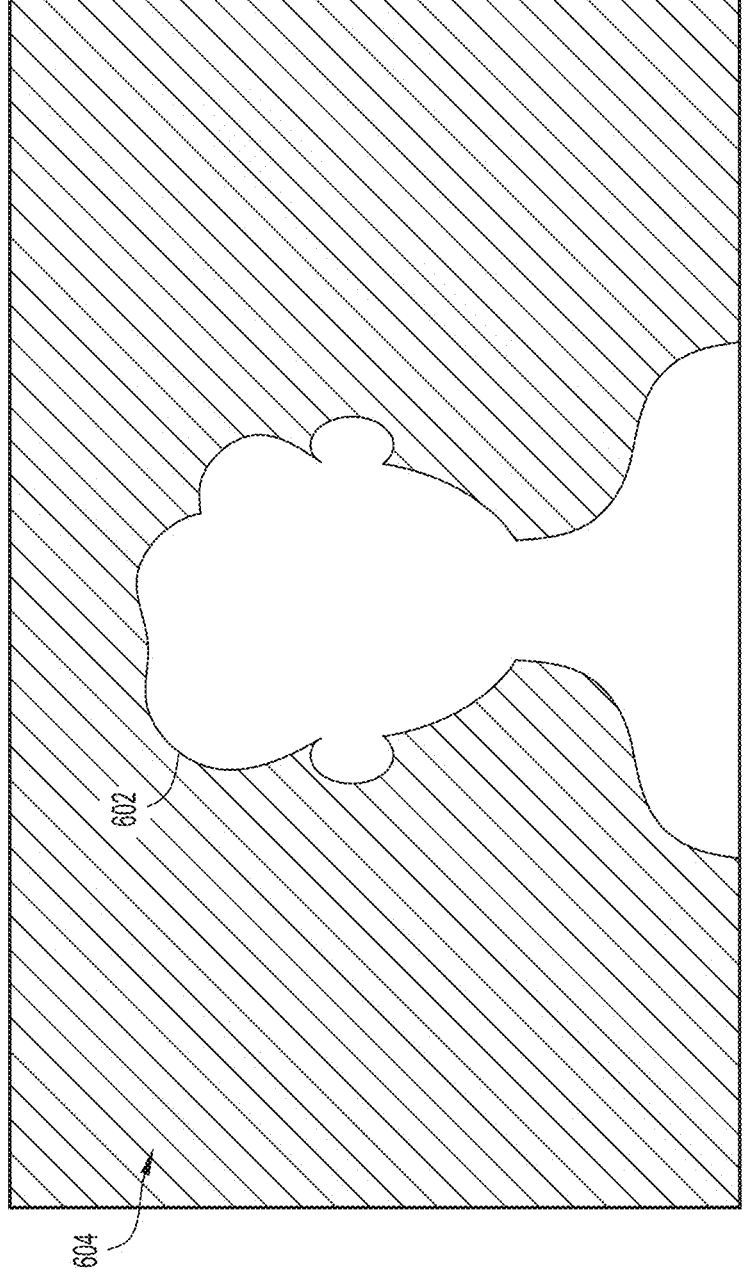
FIG. 6B is a video frame that is processed to perform background extraction using the techniques presented herein, according to an example embodiment.
Figure 6C:
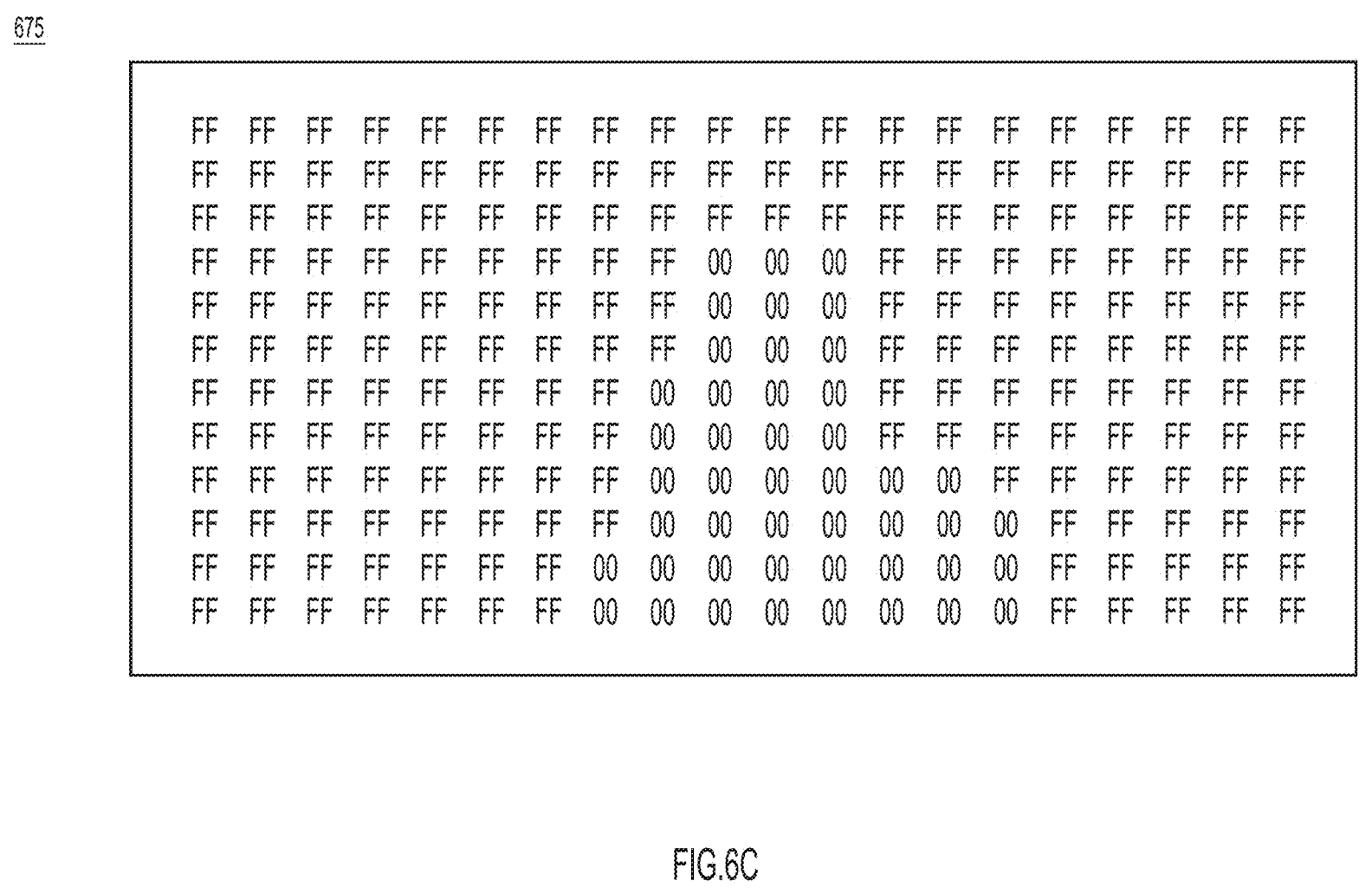

Reference is now made to FIGS. 6A, 6B and 6C. FIG. 6A depicts an input video frame 600 that is used for an example of describing the techniques presented, according to an example embodiment. As shown, input video frame 600 includes a person 602 in the foreground, as well as a background 604. A machine learning model may analyze this frame in order to identify a region of interest, which in this example embodiment may correspond to the person 602 in the foreground. Thus, as depicted in FIG. 6B, a video frame 650 is shown that is processed to perform background extraction, according to an example embodiment. Video frame 650 shows the person 602 in the foreground extracted from the background 604.

FIG. 6C is a diagram depicting a mask 675, according to an example embodiment. The mask 675 may be extracted by the machine learning model that is applied to input video frame 600, and may indicate regions of interest in the input video frame 600. As depicted, mask 675 includes labels for pixels in the input video frame 600. In this example embodiment, label "FF" is used for pixels (or groups of pixels) in the input video frame 600 that do not correspond to regions of interest, whereas label "00" is used to indicate pixels (or groups of pixels) in the input video frame 600 that do correspond to regions of interest. Thus, mask 675 can be passed to the various components of an encoder so that when input video frame 600 is divided into blocks, any blocks that spatially correspond to the pixels with the "00" label receive a higher priority during the encoding process. In other words, blocks labeled with "00" are allocated a greater number of bits during compression.

Figure 7:
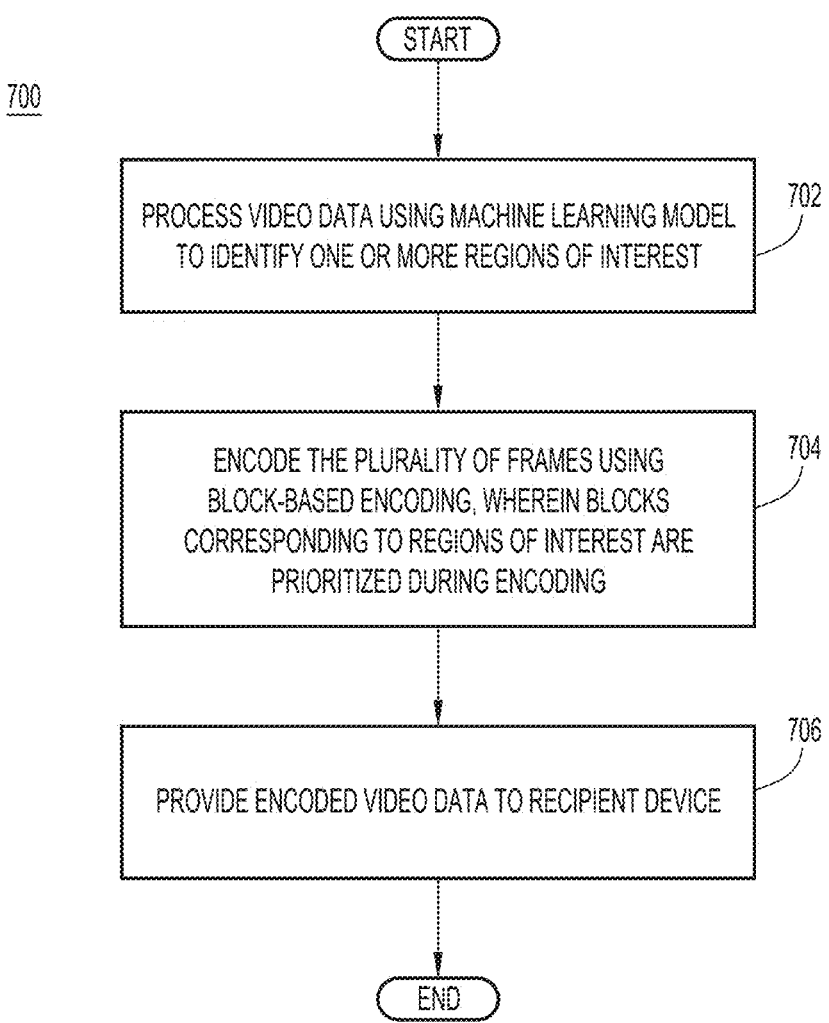
FIG. 7 is a flow chart of a method for processing video data, according to an example embodiment.

FIG. 7 is a flow chart of a method 700 for processing video data, according to an example embodiment.

Video data is processed using a machine learning model to identify one or more regions of interest at operation 702. The video data may be obtained in a raw (e.g., uncompressed) format, and can be prerecorded or a live video stream. The video data may include a plurality of frames that are each provided to a machine learning model that is trained to identify regions of interest in the video data. The regions of interest can include any desired feature, and as such, the machine learning model that is employed may be trained for a particular use case. For example, the regions of interest can include a person, a part of a person, an object present in the frame or being held by a person, an organism, an action performed by an organism or object, text, symbols, and the like. The machine learning model may generate a mask that corresponds to each frame; the mask can indicate which pixels in a frame correspond to a region of interest. In some embodiments, a subset of frames are processed by the machine learning model, such as every nth frame, or every frame that represents a threshold amount of change from the frame or frames before it. Thus, a mask can be generated for each frame, or a same mask can apply to various subsets of frames.

The plurality of frames of the video data are encoded using block-based encoding, wherein the blocks corresponding to regions of interest are prioritized during encoding at operation 704. When a frame is divided into blocks, the mask generated by the machine learning model is correlated to the blocks to identify any blocks that correspond to regions of interest. Thus, a video encoder can prioritize those blocks over other blocks during the encoding process. For example, prioritized blocks may receive a higher resolution as compared to other blocks, the prioritized blocks can include richer color data, and the like. Blocks that are not prioritized may be skip-encoded, so that those blocks are not updated between two or more frames.

The encoded video data is provided to a recipient device at operation 706. The encoded video, which is output by the encoder, can include the mask as metadata for subsequent use by a decoder. The encoded video data can be stored or transmitted for future decoding and playback. In some embodiments, a decoder may utilize the mask data in order to upscale regions of interest when decoding the encoded video data using super resolution techniques or other techniques.

Figure 8:
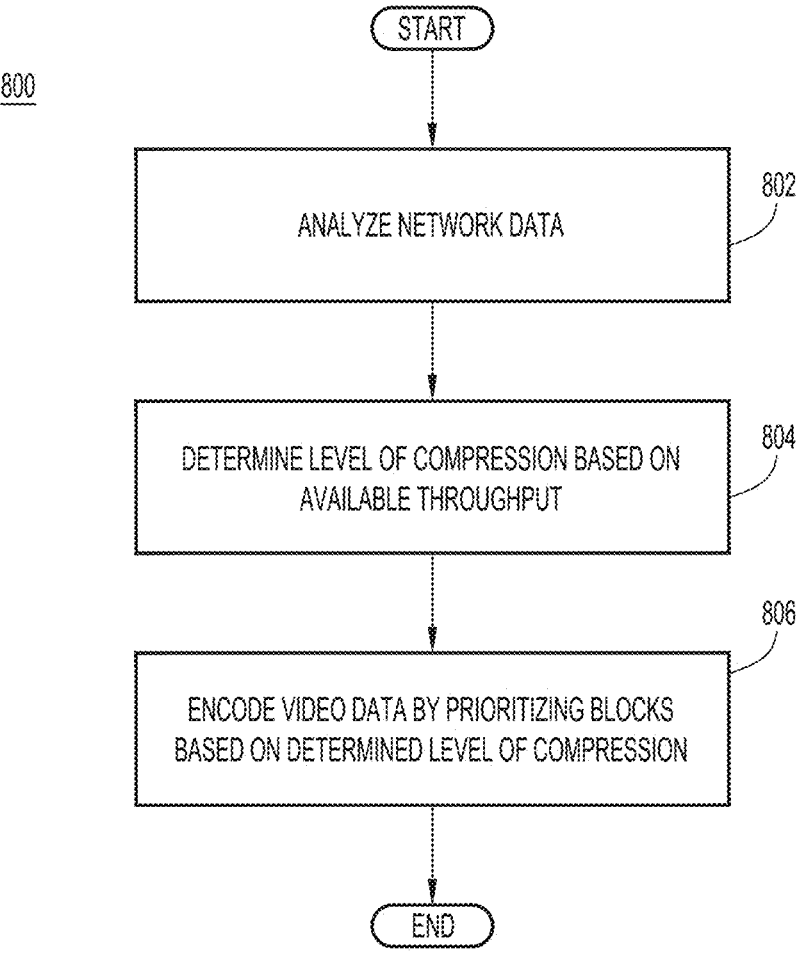
FIG. 8 is a flow chart of a method for encoding video data based on a desired level of compression, according to an example embodiment.

FIG. 8 is a flow chart of a method 800 for encoding video data, according to an example embodiment.

Network data is analyzed at operation 802. The network data may be obtained by performing a test or set of tests, such as a speed test, ping, and the like. The test(s) performed to obtain the network data may be performed between a computing device that will transmit video data and a computing device that will receive the video data. Thus, the network data may be descriptive of a level of data throughput between the devices.

A level of compression is determined based on the available throughput at operation 804. Video data of a sending device may be analyzed with respect to the resulting bitstream's bitrate that can be generated using various encoding techniques in order to select encoding parameters that ensure that the bitrate can be supported by the available throughput. Thus, a live video stream can be encoded with the identified parameters and transmitted without exceeding the available throughput.

Video data is encoded by prioritizing blocks based on the determined level of compression at operation 806. Based on the parameters identified for the target bitrate, a bitstream is generated by encoding the video data at a determined level of compression to attain the target bitrate. The encoded video data can then be transmitted to the receiving device for subsequent decoding and playback.

Figure 9:
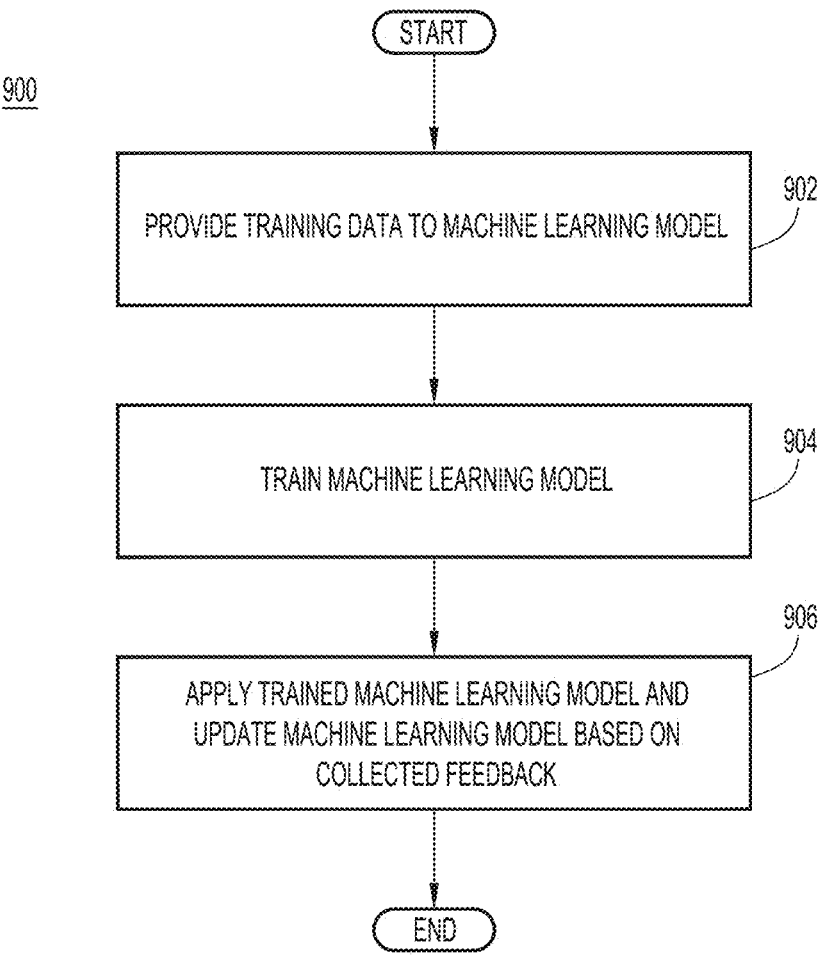
FIG. 9 is a flow chart of a method for training and applying a machine learning model for use in processing video data prior to providing to a video encoding process, according to an example embodiment.

FIG. 9 is a flow chart of a method 900 for training and applying a machine learning model, according to an example embodiment.

Training data is provided to a machine learning model at operation 902. The training data may comprise video frames that include regions of interest that are labeled for the machine learning model. The regions of interest can include any desired feature in video frames and/or motion between video frames, including objects, organisms, text, symbols, effects (e.g., motion blur), and any motions involved thereof. Each frame can be labeled with respect to whether groups of pixels correspond to a region of interest or not.

The machine learning model is trained using the training data at operation 904. The machine learning model may be trained to output a mask that indicates whether or not groups of pixels in input video data correspond to regions of interest. The machine learning model can be tested using testing data, which can be reserved from the training data or obtained elsewhere, in order to verify that the machine learning model can identify regions of interest within a threshold level of accuracy (e.g., 95% accurately, etc.). Once the machine learning model attains a desired level of accuracy for identifying the desired regions of interest, the machine learning model can be applied.

The trained machine learning model is applied and is updated based on collected feedback at operation 906. The trained machine learning model may receive as input video data, and can identify regions of interest that will receive priority during the encoding process. After decoding the video data that is encoded based on the regions of interest, user feedback can be collected that describes whether or not desired regions of interest were actually prioritized by the machine learning model. If user feedback indicates that a region of interest was not properly identified by the machine learning model (e.g., if a feature in the decoded video data does not meet a desired level of quality), then the machine learning model can be retrained using additional examples of training data that include the desired feature, thus improving the machine learning models' accuracy over time.

Figure 10:
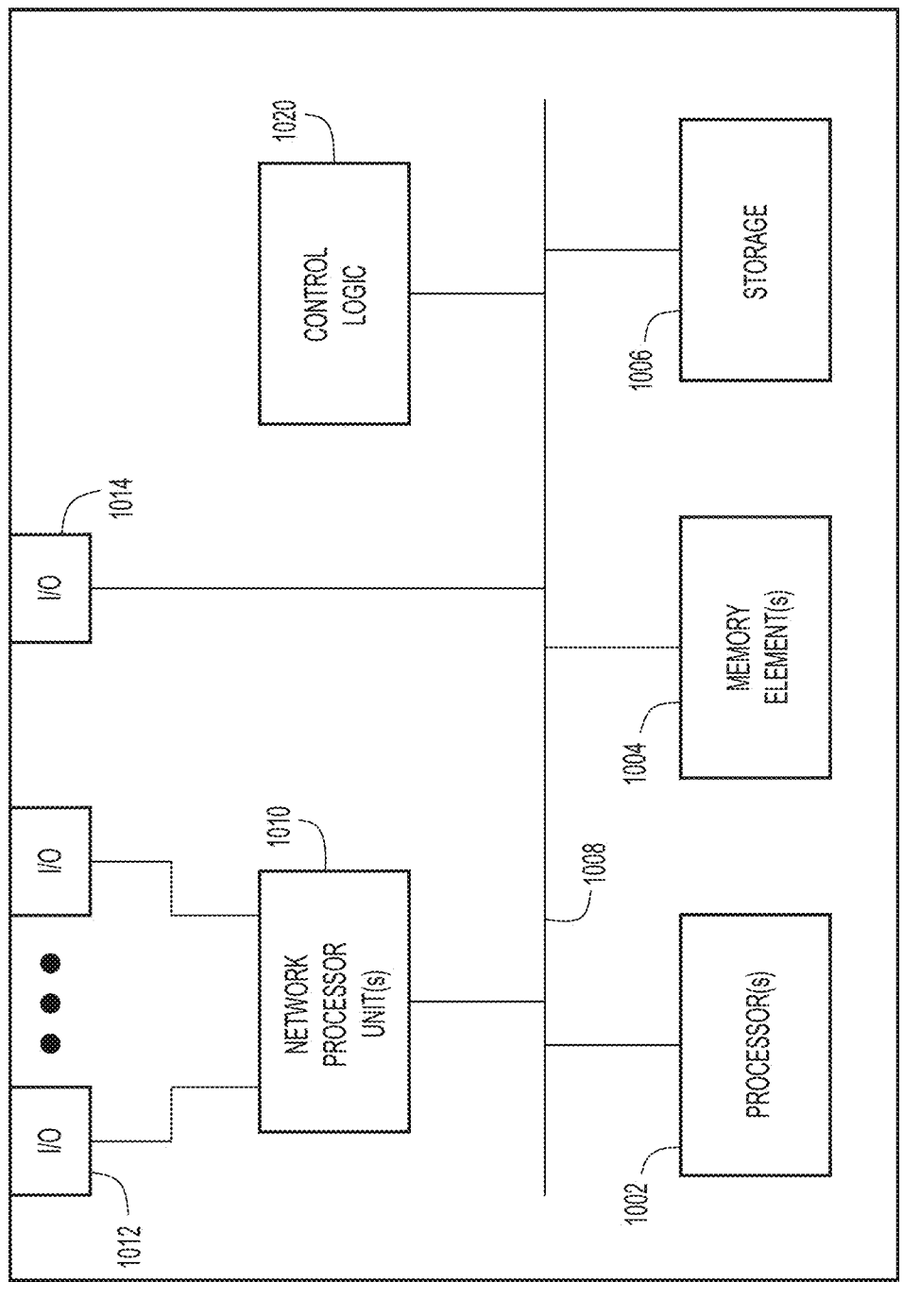
FIG. 10 is a block diagram of a device that may be configured to perform operations relating to video processing, as presented herein.

Referring now to FIG. 10, FIG. 10 illustrates a hardware block diagram of a computing device 1000 that may perform functions associated with operations discussed herein in connection with the techniques depicted in FIGS. 1-9. In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O 1014 allow for input and output of data and/or information with other entities that may be connected to computing device 1000. For example, I/O 1014 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: processing a plurality of frames of video data using a machine learning model to identify one or more regions of interest in the plurality of frames; and encoding the plurality of frames of video data by a video encoder such that one or more blocks of the plurality of frames of video data corresponding to the one or more regions of interest are prioritized over other blocks, to thereby produce encoded video data.

In some aspects, the techniques described herein relate to a computer-implemented method, further including: providing the encoded video data to a recipient device.

In some aspects, the techniques described herein relate to a computer-implemented method, further including: providing data indicating the one or more blocks corresponding to the one or more regions of interest to the recipient device.

In some aspects, the techniques described herein relate to a computer-implemented method, wherein the one or more regions of interest include one or more foreground regions.

In some aspects, the techniques described herein relate to a computer-implemented method, wherein the one or more regions of interest are selected from a group of: an upper body and head of a person appearing in the video data, one or more body parts of the person, a face of the person, a mouth and eyes of the person, and an object being held by the person.

In some aspects, the techniques described herein relate to a computer-implemented method, wherein encoding the plurality of frames of the video data includes prioritizing the mouth and eyes of the person over the face of the person.

In some aspects, the techniques described herein relate to a computer-implemented method, wherein encoding the plurality of frames of the video data includes prioritizing the face of the person over the upper body and head of the person.

In some aspects, the techniques described herein relate to a computer-implemented method, wherein the one or more regions of interest include a portion of the plurality of frames of video data that has a lower brightness compared to other portions of the plurality of frames of video data.

In some aspects, the techniques described herein relate to a computer-implemented method, further including: generating a mask based on the plurality of frames of the video data, wherein the mask indicates the one or more regions of interest.

In some aspects, the techniques described herein relate to a computer-implemented method, further including updating the mask when a threshold amount of change is identified between frames of the plurality of frames of video data.

In some aspects, the techniques described herein relate to a computer-implemented method, wherein processing includes processing a subset of frames of the plurality of frames of video data with the machine learning model.

In some aspects, the techniques described herein relate to a computer-implemented method, wherein the one or more regions of interest include one or more foreground regions in which motion is detected.

In some aspects, the techniques described herein relate to a computer-implemented method, wherein the one or more regions of interest include text that is included in any of the plurality of frames of the video data.

In some aspects, the techniques described herein relate to a system including: one or more computer processors; one or more computer readable storage media; and program instructions stored on the one or more computer readable storage media for execution by at least one of the one or more computer processors, the program instructions including instructions to: process a plurality of frames of video data using a machine learning model to identify one or more regions of interest in the plurality of frames; and encode the plurality of frames of video data by a video encoder such that one or more blocks of the plurality of frames of video data corresponding to the one or more regions of interest are prioritized over other blocks, to thereby produce encoded video data.

In some aspects, the techniques described herein relate to a system, wherein the program instructions further include instructions to: provide the encoded video data to a recipient device.

In some aspects, the techniques described herein relate to a system, wherein the program instructions further include instructions to: provide data indicating the one or more blocks corresponding to the one or more regions of interest to the recipient device.

In some aspects, the techniques described herein relate to a system, wherein the one or more regions of interest are selected from a group of: an upper body and head of a person appearing in the video data, one or more body parts of the person, a face of the person, a mouth and eyes of the person, and an object being held by the person.

In some aspects, the techniques described herein relate to one or more non-transitory computer readable storage media having program instructions embodied therewith, the program instructions executable by a computer to cause the computer to perform operations including: processing a plurality of frames of video data using a machine learning model to identify one or more regions of interest in the plurality of frames; and encoding the plurality of frames of video data by a video encoder such that one or more blocks of the plurality of frames of video data corresponding to the one or more regions of interest are prioritized over other blocks, to thereby produce encoded video data.

In some aspects, the techniques described herein relate to one or more non-transitory computer readable storage media, wherein the program instructions further cause the computer to: provide the encoded video data to a recipient device.

In some aspects, the techniques described herein relate to one or more non-transitory computer readable storage media, wherein the program instructions further cause the computer to: provide data indicating the one or more blocks corresponding to the one or more regions of interest to the recipient device.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   generating a mask based on a plurality of frames of video data, wherein the mask indicates one or more regions of interest;

generating, using a machine learning model, at least one additional mask when a threshold amount of change is identified between frames of the plurality of frames of video data;

processing the plurality of frames of video data using the mask and the at least one additional mask to identify the one or more regions of interest in the plurality of frames, wherein the one or more regions of interest are determined dependent on a network bandwidth; and encoding the plurality of frames of video data by a video encoder such that one or more blocks of the plurality of frames of video data corresponding to the one or more regions of interest are prioritized over other blocks based on metadata generated by the machine learning model, to thereby produce encoded video data.

2. The computer-implemented method of claim 1, further comprising:

providing the encoded video data to a recipient device.

3. The computer-implemented method of claim 2, further comprising:

providing data indicating the one or more blocks corresponding to the one or more regions of interest to the recipient device.

4. The computer-implemented method of claim 1, wherein the one or more regions of interest comprise one or more foreground regions.

5. The computer-implemented method of claim 1, wherein the one or more regions of interest are selected from a group of: an upper body and head of a person appearing in the video data, one or more body parts of the person, a face of the person, a mouth and eyes of the person, and an object being held by the person.

6. The computer-implemented method of claim 5, wherein encoding the plurality of frames of the video data comprises prioritizing the mouth and eyes of the person over the face of the person by encoding the mouth and eyes of the person with a greater number of bits than that for the face of the person.

7. The computer-implemented method of claim 5, wherein encoding the plurality of frames of the video data comprises prioritizing the face of the person over the upper body and head of the person by encoding the face of the person with a greater number of bits than that for the upper body and head of the person.

8. The computer-implemented method of claim 1, wherein the one or more regions of interest comprise a portion of the plurality of frames of video data that has a lower brightness compared to other portions of the plurality of frames of video data.

9. The computer-implemented method of claim 1, wherein the one or more regions of interest comprise one or more foreground regions in which motion is detected.

10. The computer-implemented method of claim 1, wherein the one or more regions of interest comprise text that is included in any of the plurality of frames of the video data.

11. The computer-implemented method of claim 1, wherein the one or more regions of interest that are prioritized are encoded, based on the metadata, more quickly than the other blocks.

12. The computer-implemented method of claim 1, wherein the one or more regions of interest comprise text in a slide of a presentation.

13. The computer-implemented method of claim 1, wherein each of one or more pixels in the at least one additional mask is labeled to indicate a presence or an absence of the one or more regions of interest.

14. A system comprising:

one or more computer processors;

one or more computer readable storage media; and program instructions stored on the one or more computer readable storage media for execution by at least one of the one or more computer processors, the program instructions comprising instructions to:

generate a mask based on a plurality of frames of video data, wherein the mask indicates one or more regions of interest;

generate, using a machine learning model, at least one additional mask when a threshold amount of change is identified between frames of the plurality of frames of video data;

process the plurality of frames of video data using the mask and the at least one additional mask to identify the one or more regions of interest in the plurality of frames, wherein the one or more regions of interest are determined dependent on a network bandwidth; and encode the plurality of frames of video data by a video encoder such that one or more blocks of the plurality of frames of video data corresponding to the one or more regions of interest are prioritized over other blocks based on metadata generated by the machine learning model, to thereby produce encoded video data.

15. The system of claim 14, wherein the program instructions further comprise instructions to:

provide the encoded video data to a recipient device.

16. The system of claim 15, wherein the program instructions further comprise instructions to:

provide data indicating the one or more blocks corresponding to the one or more regions of interest to the recipient device.

17. The system of claim 14, wherein the one or more regions of interest are selected from a group of: an upper body and head of a person appearing in the video data, one or more body parts of the person, a face of the person, a mouth and eyes of the person, and an object being held by the person.

18. One or more non-transitory computer readable storage media having program instructions embodied therewith, the program instructions executable by a computer to cause the computer to perform operations including:

generating a mask based on a plurality of frames of video data, wherein the mask indicates one or more regions of interest;

generating, using a machine learning model, at least one additional mask when a threshold amount of change is identified between frames of the plurality of frames of video data;

processing the plurality of frames of video data using the mask and the at least one additional mask to identify the one or more regions of interest in the plurality of frames, wherein the one or more regions of interest are determined dependent on a network bandwidth; and encoding the plurality of frames of video data by a video encoder such that one or more blocks of the plurality of frames of video data corresponding to the one or more regions of interest are prioritized over other blocks based on metadata generated by the machine learning model, to thereby produce encoded video data.

19. The one or more non-transitory computer readable storage media of claim 18, wherein the program instructions further cause the computer to:

provide the encoded video data to a recipient device.

20. The one or more non-transitory computer readable storage media of claim 19, wherein the program instructions further cause the computer to:

provide data indicating the one or more blocks corresponding to the one or more regions of interest to the recipient device.

\* \* \* \* \*